Feb. 25, 1941.   E. A. CORBIN, JR   2,233,074
ROTARY GATE AND ORIFICE VALVE
Filed Feb. 21, 1939   3 Sheets-Sheet 1

ELBERT A. CORBIN JR.
INVENTOR.
BY Louis Necho
ATTORNEY.

Feb. 25, 1941. E. A. CORBIN, JR 2,233,074
ROTARY GATE AND ORIFICE VALVE
Filed Feb. 21, 1939   3 Sheets-Sheet 2
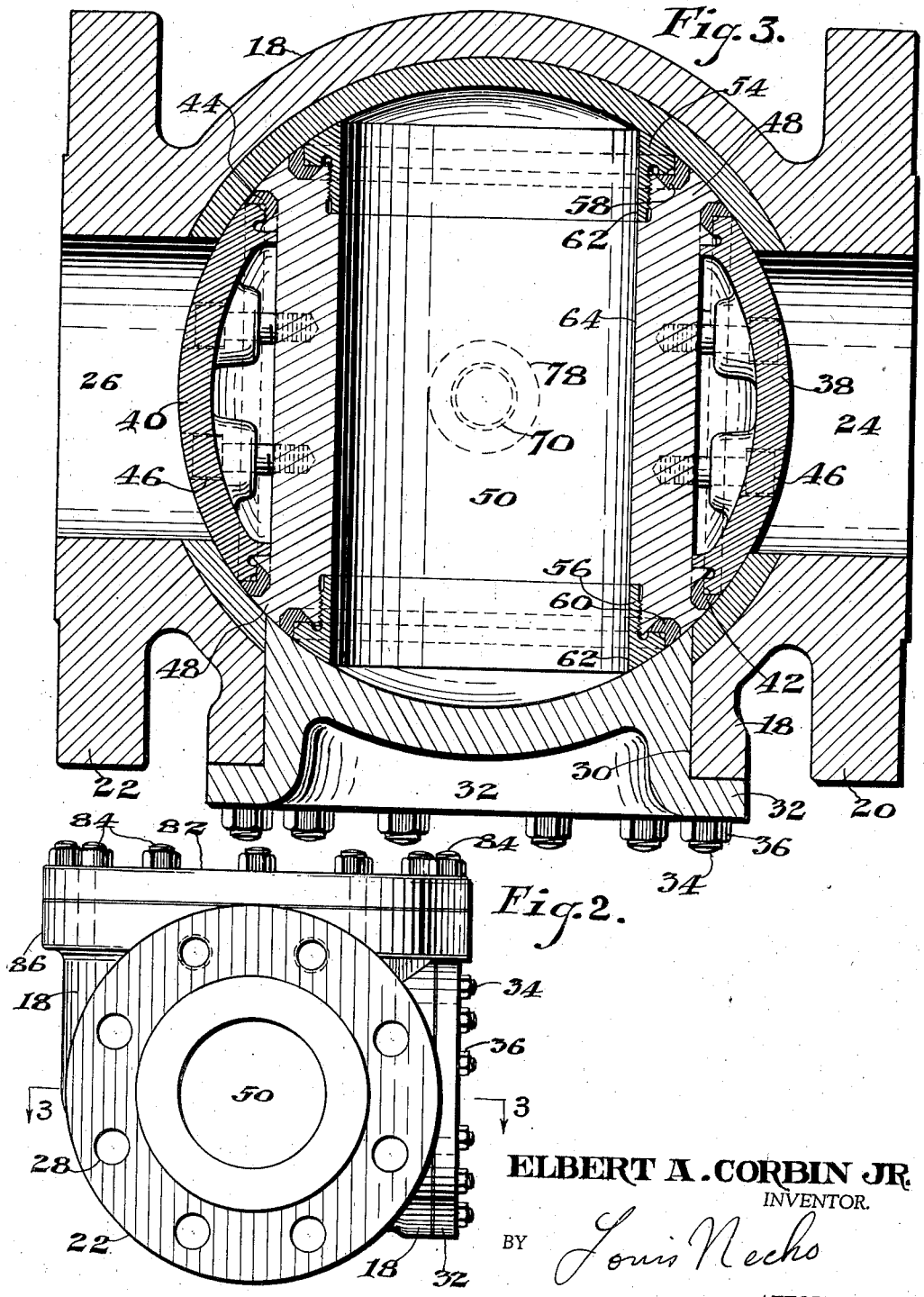
ELBERT A. CORBIN JR.
INVENTOR.
BY Louis Necho
ATTORNEY.

Feb. 25, 1941. E. A. CORBIN, JR 2,233,074
ROTARY GATE AND ORIFICE VALVE
Filed Feb. 21, 1939 3 Sheets-Sheet 3

ELBERT A. CORBIN JR.
INVENTOR.
BY Louis Necho
ATTORNEY.

Patented Feb. 25, 1941

2,233,074

UNITED STATES PATENT OFFICE 2,233,074

ROTARY GATE AND ORIFICE VALVE

Elbert A. Corbin, Jr., Lansdowne, Pa., assignor of one-half to William C. Biddle, Lansdowne, Pa.

Application February 21, 1939, Serial No. 257,582

3 Claims. (Cl. 251—103)

My invention relates to a new and useful rotary gate and orifice valve, that is, one in which the fully open and unobstructed through-passage of a gate valve is obtained by means of a rotary valve as distinguished from a reciprocal valve which is the characteristic of gate valves now known and used, and one in which the passage of fluid can be regulated by means of an orifice fitting which can be interchanged without the aid of involved or built-in machinery and without the need for auxiliary valves for shutting off the lines on either side of the valve while the orifice is being changed.

My invention further relates to an orifice valve the internal construction of which completely eliminates all turbulence thus preventing precipitation of sediment which results in ultimate, complete obstruction.

In the oil industry, for instance, it is now customary to use gate valves which are operated by means of a reciprocating plate which travels between suitable guides and which is withdrawn by mechanical appliances such as gears and ratchets to open the valve, or which is moved in the reverse direction to close the throat of the valve. This kind of valve is used when unobstructed passage is desired so as to utilize the entire capacity of the throat of the valve. Also in the oil industry, for example, it is necessary to use what is known in the trade as an orifice valve, namely, one in which means are provided for restricting the passage of the fluid from the section of the line to one side of the valve into the section of the line on the other side of the valve, and the valve construction now almost universally used is one in which a plate having a central opening therein of the desired dimensions is inserted by gears and ratchets into the body of the valve centrally between the two sections of pipe interconnected by the valve so that the rate of flow of the oil through the valve is predetermined by the size of the central opening or orifice in said plate. In this construction there is a serious disadvantage which greatly adds to the cost of maintenance in addition to the initial cost of construction and this disadvantage results from the fact that as the fluid passes from one section of a pipe through the orifice into the other section turbulence and eddying takes place with the result that the valve "cokes" which means that carbon solids are precipitated and adhere to the orifice plate and adjacent parts thus gradually obstructing the passage and otherwise interfering with the flow, and, as is well known, such carbon deposits adhere to the metal so firmly as to become almost a part thereof and be almost impossible to remove without damaging the surfaces to which they adhere.

It is therefore the primary object of my invention to provide a valve which can be used as an ordinary, plain valve, that is, one in which the opening is either wholly or completely closed, and in which the valve throat or opening is completely free of all obstruction to prevent carbon deposits, my novel valve being also adapted to be equipped with an orifice fitting of any desired size which will change the construction from the ordinary gate valve to an orifice valve while at the same time maintaining the opening or passage through the valve completely unobstructed and hence free of carbon and other deposits.

Other features of construction and advantage will be more clearly understood from the following specification and the accompanying drawings in which—

Fig. 2 represents, on a reduced scale, a view in end elevation looking at the right hand side of the valve as shown in Fig. 1.

Fig. 3 represents, on an enlarged scale, a section on line 3—3 of Fig. 2 with the valve shown in closed position.

Fig. 4 represents a vertical sectional view of a slightly modified form of construction showing the valve in the open position.

Fig. 5 represents a view in elevation of a "Venturi" type of orifice adjusting device used in Fig. 4.

Fig. 6 represents a partial end elevation of Fig. 5.

Fig. 7 represents a view, in side elevation, of the fitting forming part of the valve and which is removed for insertion of the orifice device in Fig. 5.

Figure 1:
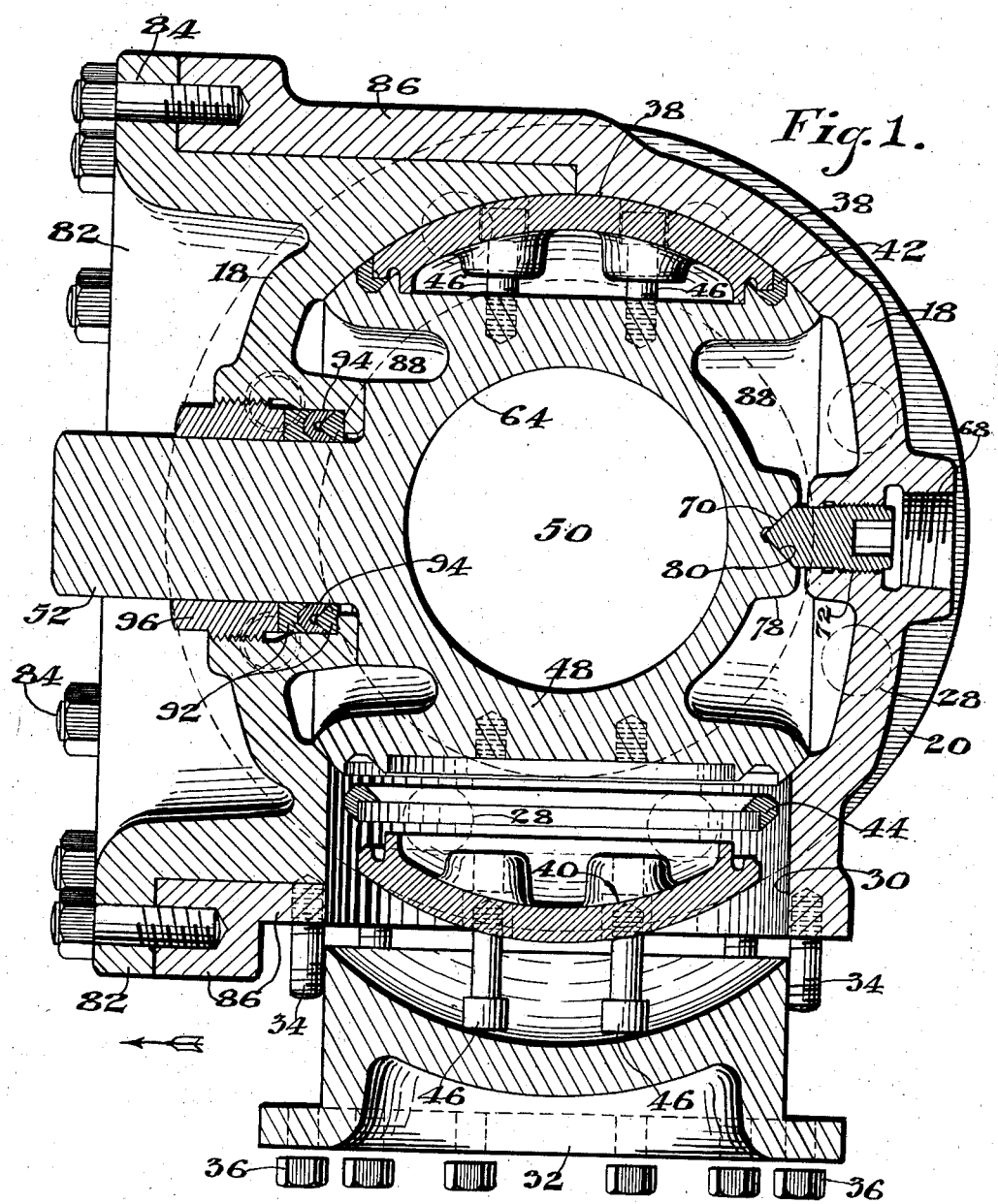
Fig. 1 represents a vertical sectional view of a rotary gate valve embodying my invention, certain parts being shown in a partially dismantled state in order to illustrate details of construction.

Referring to the drawings in which like reference characters indicate like parts, it will be seen that my novel valve comprises a generally spherical housing 18 which is provided with the oppositely disposed connecting flanges 20 and 22 through which extend the passages 24 and 26, either of which may serve as an inlet or an outlet as desired, it being understood that the flanges 20 and 22 are adapted to be connected to suitably flanged pipe line sections (not shown) by any suitable devices such as bolts or the like passing through the openings 28. The housing 18 is provided with an opening 30 which is normally closed by the cover 32 which is held in place by the studs 34 which are adapted to be engaged by the nuts or the like 36. The opening 30, when the cover 32 is removed as shown in Fig. 1, affords access to the convex packing plates 38 and 40 which retain the packings 42 and 44. The packing plates 38 and 40 are retained by the bolts or the like 46 which engage on the opposite sides of the rotor 48. The rotor 48 is actuated by a stem 52 the upper end of which can be engaged by any suitable wrench or other tool. When it is desired to repair or renew the packings 42 or 44, it is merely necessary to turn the rotor 48 until either the packing plate 38 or 40 registers with the opening 30, whereupon, when the cover 32 is removed and the bolts 46 are disengaged, the particular packing plate 38 or 40 can be withdrawn and the corresponding packing 32 or 44 can also be removed. It will be noted that the packing plates 38 and 40 with their packings 42 and 44 are in service when the valve is in the closed position as shown in Fig. 3. In order to provide for a liquid-tight connection when the valve is in the open position as shown in Fig. 4 I thread into the opposite ends of the rotor 48 the packing retainers 54 and 56 which retain the corresponding packings 58 and 60. The packings 58 and 60, not only serve to provide a liquid-tight construction for the valve in its open position, but also, as will be best seen from Fig. 4, they serve to effect a liquid-tight connection even if the cover 32 and the adjacent packing plate 38 or 40 and its corresponding packing 42 or 44 were to be removed as shown in Fig. 1. It is to be noted that the packing retainers 54 and 56 are assembled with respect to the rotor 48 so that the inner surfaces 62 form a smooth and uninterrupted continuation of the inner bore 64 of the rotor 48 thus eliminating all obstructions, making a clear through passage, and preventing any turbulence which would necessarily result were anything to project inwardly from the plane 64 of the bore of the rotor 48. On the side of the housing 18 opposite to the stem 52 I provide an opening 68 through which I insert the pivot bearing 70 which is threaded in position as at 72. If desired I may use the auxiliary retaining nut 74 shown in Fig. 4, and, in any event, I utilize the plug 76 for closing the opening 68 against leakage. The plug 76 is only shown in Fig. 4 and is omitted from Fig. 1. The rotor 48 is provided with a hub 78 which is provided with a recess 80 for engaging the tapered end of the pivot bearing 70 which serves to center the rotor. In order to be able to remove the rotor 48 together with the packing plates 38 and 40 and their adjuncts I provide, on the side of the housing 18 opposite to the location of the pivot bearing 70, an opening which is slightly greater than the diameter of the rotor and this opening is normally closed by the cover 82 which is retained in the closed position by the studs 84 or the like which engage the neck 86 of the housing 18. In order to lighten the construction I have provided the cut-outs 88. The operating stem 52 projects through an opening in the cover 82 and is provided with the packing glands 92, the packing 94 and the retaining nut 96.

In Figs. 4 to 7 I have shown a slightly modified form of construction in which, instead of the uniform diameter through-opening 24, 50 and 26, I have provided means for installing a detachable orifice regulating and restricting device which is in the form of a "Venturi" throat 98 which is provided with a central bushing 100 made of corrosion and wear-proof material, it being understood that the center opening 102 of the throat 98 can be of any desired dimensions without changing the overall dimensions of the throat 98 itself. In other words, if it is desired to regulate the flow through a two inch pipe and to restrict it or enlarge it at will, it is merely necessary to replace the Venturi throat 98 with one having a similar or larger opening 102. On one end of the Venturi throat 98 I provide the threaded collar 104 and the spherical head 106. By reference to Fig. 7 it will be seen that the collar 104 and spherical head 106 are identical with one of the packing retaining members 54 or 56. In order to apply the Venturi throat 98 to the valve construction shown for instance in Fig. 1, it is merely necessary to remove the packing retainer 54 and to insert the Venturi throat 98, and finally to thread the collar 104 with the head 106 which is adapted to be engaged by a spanner wrench or the like engaging the holes 108 in place of the packing retainer 54. The throat 98 will then assume the position shown in Fig. 4 with the other tapered end 110 of the throat 98 overlying the packing retainer 56. In this way the cylindrical walls of the openings 24 and 26 gradually merge into centrally converging inner walls 112 of the Venturi throat 98 thus again presenting a smoothness and continuity of surface which prevents turbulence.

In the construction shown in Figs. 1 and 3, due to the fact that the openings 24, 50 and 26 are of the same diameter, no differential pressure gage is necessary, but, where the orifice regulating device, in the nature of the Venturi throat 98, is used, it becomes desirable to gage the pressure on either side of the restricted center opening 102 and this is done by providing the tappings 114 and 116 to which suitable pressure gages (not shown) are applied. It is to be understood that, if desired I may use the ball bearings 118 to facilitate operation.

With respect to the stem 52 I wish to point out that I contemplate providing the outer or operating end thereof with a hand wheel, a train of gears, or other suitable leverage to facilitate turning but I have not shown such hand wheel or gears in the drawings since I believe that any person skilled in the art can apply them without the exercise of invention.

Having thus described my invention, what I claim as new and desire to secure by Letters Patent is:

1. A valve of the character described comprising an internally spherical housing having an inlet and outlet, a substantially spherical rotor disposed within said housing and having a through opening therein adapted to register with said inlet and outlet, means for turning said rotor, packing members forming part of said rotor and disposed on opposite sides of the through opening, there being an opening in the wall of said housing to afford access to said packing members, and a removable cover for said last-mentioned opening.

2. A valve of the character described comprising an internally spherical housing having an inlet and outlet, a substantially spherical rotor disposed within said housing and having a through opening therein, a stem for actuating said rotor, packing members forming part of said rotor and disposed on opposite sides of said through opening, there being an opening in the wall of said housing to afford access to said packing members, a removable cover for said last-mentioned opening, and a pivot carried by said housing and engaging a bearing in said rotor at a point opposite to said stem.

3. A valve of the character described comprising an internally spherical housing having an inlet and outlet, a substantially spherical rotor disposed within said housing and having a through opening therein, a stem for turning said rotor, packing members forming part of said rotor and disposed on opposite sides of said through opening, there being an opening in the wall of said housing to afford access to said packing members, a removable cover for said last-mentioned opening, and an adjustable pivot carried by said housing and engaging a bearing in said rotor at a point opposite to said stem, there being an opening formed in the wall of said housing opposite to said pivot bearing for removal of said rotor as a unit from said housing.

ELBERT A. CORBIN, JR.